(12) United States Patent
Sun et al.

(10) Patent No.: US 11,415,952 B2
(45) Date of Patent: Aug. 16, 2022

(54) METHOD, APPARATUS, AND STORAGE MEDIUM FOR CONTROLLING HEATING SYSTEM

(71) Applicant: Tsinghua University, Beijing (CN)

(72) Inventors: Hongbin Sun, Beijing (CN); Qinglai Guo, Beijing (CN); Bin Wang, Beijing (CN); Guanxiong Yin, Beijing (CN); Tongtian Sheng, Beijing (CN); Zhaoguang Pan, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/146,767

(22) Filed: Jan. 12, 2021

(65) Prior Publication Data

US 2021/0132558 A1 May 6, 2021

Related U.S. Application Data

(63) Continuation of application No. PCT/CN2018/112695, filed on Oct. 30, 2018.

(30) Foreign Application Priority Data

Jul. 20, 2018 (CN) .......................... 201810804007.7

(51) Int. Cl.
*G05B 17/02* (2006.01)
*F24D 19/10* (2006.01)
(52) U.S. Cl.
CPC ......... *G05B 17/02* (2013.01); *F24D 19/1066* (2013.01)

(58) Field of Classification Search
CPC . G05B 17/02; F24D 19/1066; G06F 2119/08; G06F 30/20
See application file for complete search history.

(56) References Cited

U.S. PATENT DOCUMENTS

2016/0018125 A1* 1/2016 Hamstra .................. F24F 11/62
703/7

FOREIGN PATENT DOCUMENTS

CN 106447529 A * 2/2017 ........... G06F 30/367

OTHER PUBLICATIONS

WIPO, ISR for PCT/CN2018/112695, dated Apr. 23, 2019.

* cited by examiner

*Primary Examiner* — Chad G Erdman
(74) *Attorney, Agent, or Firm* — Hodgson Russ LLP

(57) ABSTRACT

The disclosure provides a method, an apparatus, and a storage medium for controlling a heating system in a combined heat and power system. The method includes: establishing a load flow model of the heating system, in which the heating system includes pipelines and nodes; the nodes include loads and heating sources; the load flow model includes an objective function and constraints; the objective function for maximizing and minimizing an inlet water temperature of each load or each source; solving the load flow model to obtain an upper limit and a lower limit of the inlet water temperature of each load or each source; and controlling the inlet water temperature of each load or each source based on the upper limit and the lower limit of the inlet water temperature of each load or each source.

12 Claims, 1 Drawing Sheet

METHOD, APPARATUS, AND STORAGE MEDIUM FOR CONTROLLING HEATING SYSTEM

CROSS REFERENCE TO RELATED APPLICATION

This application is a continuation of International Application No. PCT/CN2018/112695 filed on Oct. 30, 2018, which claims priority to Chinese Patent Application No. 201810804007.7 filed on Jul. 20, 2018, the entire contents of which are incorporated herein by reference.

FIELD

The disclosure relates to a solution for controlling a heating system in a combined heat and power system, which belongs to the field of operation and control technologies for the combined heat and power system.

BACKGROUND

To improve the overall utilization efficiency of various energy sources and the capacity of absorbing renewable energy sources, requirements of interconnected and complementary integration on multiple energy sources are growing rapidly, and an integrated energy system has become one of important trends in the development of energy systems. The combined heat and power system is an important portion of the integrated energy system.

The combined heat and power system includes an electricity system and a heating system coupled with each other. The conventional heating system (not coupled to the electricity system) does not require high control precision, while the combined heat and power system puts forward new requirements on the accurate and safe control of the heating system.

There is uncertainty in parameters for modeling and controlling the heating system, such as the length, inner diameter, roughness and heat dissipation coefficient of pipelines, which are given by the manufacturer but often deviate from true values. Also, some parameters of pipelines will change through changes in operating time and conditions. The above problems may be ignored in the control of the conventional heating system due to low control precision requirements. The combined heat and power system requires high control precision, which requires new requirements for considering parameter uncertainty.

SUMMARY

According to a first aspect of embodiments of the disclosure, there is provided a method for controlling a heating system. The method includes: establishing a load flow model of the heating system, in which the heating system includes pipelines and nodes; the nodes include loads and heating sources; the load flow model includes an objective function and constraints; the objective function for maximizing and minimizing an inlet water temperature of each load or each source; solving the load flow model to obtain an upper limit and a lower limit of the inlet water temperature of each load or each source; and controlling the inlet water temperature of each load or each source based on the upper limit and the lower limit of the inlet water temperature of each load or each source.

According to a second aspect of embodiments of the disclosure, there is provided an apparatus for controlling a heating system. The apparatus includes a processor; and a memory for storing instructions executable by the processor. The processor is configured to execute the instructions to carry out the above method.

According to a third aspect of embodiments of the disclosure, there is provided a non-transitory computer-readable storage medium having stored therein instructions that, when executed by a processor of a computer, causes the computer to perform the above method.

BRIEF DESCRIPTION OF THE DRAWINGS

The accompanying drawings, which are incorporated in and constitute a part of this specification, illustrate embodiments consistent with the disclosure and, together with the description, explain the principles of the disclosure.

DETAILED DESCRIPTION

The disclosure aims to propose a solution for controlling a heating system. The solution considers the range of heat dissipation coefficient, obtains more accurate information of the load flow by considering the uncertainty of the parameters given by a manufacturer, and controls the heating system based on the more accurate information, so as to satisfy quality requirements of multi-energy connection in the integrated energy system.

Figure 1:
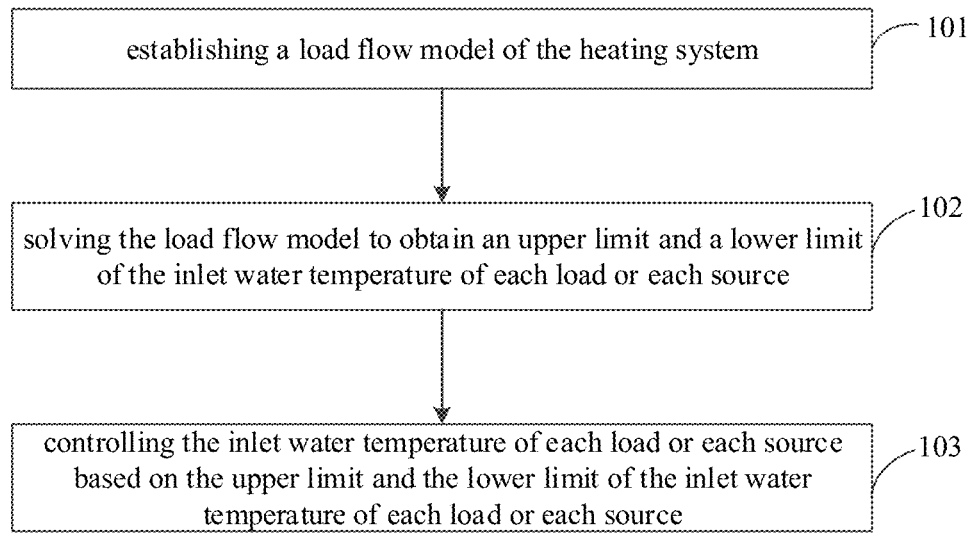
FIG. 1 is a flowchart illustrating a method for controlling a heating system, according to some embodiments.

FIG. 1 is a flowchart illustrating a method for controlling a heating system, according to some embodiments. As illustrated in FIG. 1, the method may include the following actions.

At block 101, a load flow model of the heating system is established, in which the heating system includes pipelines and nodes; the nodes include loads and heating sources; the load flow model includes an objective function and constraints; the objective function for maximizing and minimizing an inlet water temperature of each load or each source.

At block 102, the load flow model is solved to obtain an upper limit and a lower limit of the inlet water temperature of each load or each source.

At block 103, the inlet water temperature of each load or each source is controlled based on the upper limit and the lower limit of the inlet water temperature of each load or each source.

The detail of the above method may be described as follows.

(1) State estimation results of the heating system may be obtained from a data collection and monitoring center in the heating system. The state estimation results include: a flow rate of each of the pipelines, an outlet water temperature of each of the heating sources, and an outlet water temperature of each of the loads.

(2) A heat dissipation coefficient $\lambda_j$ of each of the pipelines is obtained from the design manual given by the manufacturer, where j represents the $j^{th}$ pipeline.

(3) The heat dissipation coefficient $\lambda_j$ of each of the pipelines is set to be within a preset interval $[\lambda_{j,l}, \lambda_{j,u}]$. $\lambda_{j,l}$ and $\lambda_{j,u}$ are obtained by formulas of:

$$\lambda_{j,l} = \lambda_j \times \sigma_l, \text{ and}$$

$$\lambda_{j,u} = \lambda_j \times \sigma_u,$$

where, $\sigma_l$ and $\sigma_u$ represent fluctuation ratios of the heat dissipation coefficient, which are considered by the conventional heating system.

$\sigma_l$ and $\sigma_u$ are preset values, satisfying:

$$0 < \sigma_l < 1.$$

$$\sigma_u > 1.$$

(4) A load flow model of the heating system may be established, which may include the following.

(4-1) Coupling constraints for the heating system, which are denoted by formulas of:

$$\text{s.t. } T_{end,j} = (T_{start,j} - T_a)e^{-\frac{\lambda_j L_j}{C_p \dot{m}_j}} + T_a, j = 1, 2, \ldots, M,$$

$$\left(\sum_{j \in \Psi_i^+} \dot{m}_j\right) T_i + \dot{m}_i^{out} T_i^{out} = \sum_{j \in \Psi_i^-} (\dot{m}_j T_{end,j}) + \dot{m}_i^{in} T_i^{in}, i = 1, 2, \ldots, N,$$

where, j represents a serial number of a pipeline in the heating system,

M represents a total number of pipelines, i represents a serial number of a node in the heating system, N represents a total number of nodes, $T_{end,j}$ represents a water temperature of an end terminal of pipeline j, $T_{start,j}$ represents a water temperature of a start terminal of pipeline j, $T_a$ represents an ambient temperature;

$\lambda_j$ represents a heat dissipation coefficient of pipeline j, $L_j$ represents a length of pipeline j, $C_p$ represents a specific heat at constant pressure of the fluid (usually water) in the pipeline, $\dot{m}_j$ represents a mass flow rate of the fluid flowing through pipeline j, $T_i$ represents a water temperature of the node i, $\dot{m}_i^{in}$ represents a mass flow rate of the fluid flowing into node i from the load or the source, $T_i^{in}$ represents the outlet water temperature of the load or the source connecting to the node i, $\dot{m}_i^{out}$ represents a mass flow rate of the fluid flowing from node i into the load or the source, $T_i^{out}$ represents the inlet water temperature of the load or the source connecting to the node i, $\Psi_i^+$ represents a set of pipelines of which the start terminal is node i, and $\Psi_i^-$ represents a set of pipelines of which the end terminal is node i.

(4-2) An upper and lower bound constraint of the heat dissipation coefficient, which is denoted by the following formula of:

$$\underline{\lambda_{j,l}} \leq \lambda_j \leq \lambda_{j,u},$$

where, $\underline{\lambda_{j,l}}$ and $\lambda_{j,u}$ are determined at the action of (3).

(4-3) The objective function (i.e., the optimization target) of the load flow model is established as the formulas of:

$$\max T_i^{out}, i \in \Psi^l \cup \Psi^s, \text{ and}$$

$$\min T_i^{out}, i \in \Psi^l \cup \Psi^s$$

where, $\Psi^l$ represents a serial number of nodes connecting to each load, $\Psi^s$ represents a serial number of nodes connecting to each source.

The objective function is a multi-objective multi-optimization problem of which the constraints are built in (4-1) and (4-2). That is, the maximum or minimum value of one variable is optimized each time.

(5) The trust region reflection algorithm, effective set algorithm, interior point method or sequential quadratic programming algorithm is employed to calculate the upper and lower limit of the inlet temperature of the loads and sources $T_i^{out}$, realizing the load flow calculation of the heating system by considering the coefficient range of heat dispersion.

(6) The inlet temperature of the loads and sources in the heating system may be controlled based on the upper and lower limit of the inlet temperature of the loads and sources.

The disclosure takes into account the fact that the heat dissipation coefficient provided by the manufacturer and the true value of the heat dissipation coefficient are different, and the true heat dissipation coefficient will change with the aging of the pipeline and the insulation layer, so the heat dissipation coefficient is described as an interval, to solve the load flow solution of the central heating system in the parameter interval. Such the load flow solution can provide more comprehensive information for system operation control, and facilitate the operator to consider the safety risk caused by the deviation of the heat dissipation coefficient and the true value in the control and adjustment. The disclosure can overcome the existing error in calculating the load flow of the heating system, and obtain a more conservative and reliable load flow solution, which is beneficial to the safe operation and control of the heating system.

Figure 2:
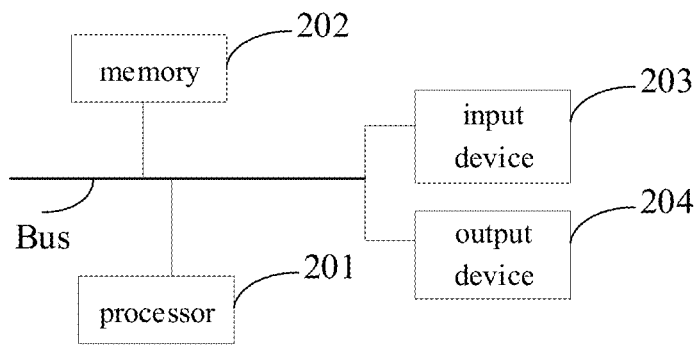
FIG. 2 is a block diagram illustrating an apparatus for controlling a heating system, according to some embodiments.

FIG. 2 is a block diagram illustrating an apparatus for controlling a heating system, according to some embodiments. The apparatus may be intended to represent various forms of digital computers, such as laptop computers, desktop computers, workbenches, personal digital assistants, mainframe computers, and other suitable computers. The apparatus may also be intended to represent various forms of mobile devices, such as personal digital processing, cellular phones, smart phones, wearable devices, and other similar computing devices. The components shown here, their connections and relations, and their functions are merely examples, and are not intended to limit to the implementation of the disclosure described and/or required herein.

As illustrated in FIG. 2, the computer includes: one or more processors 201, a memory 202, and interfaces for connecting various components, including high-speed interfaces and low-speed interfaces. The various components are interconnected using different buses and can be mounted on a common mainboard or otherwise installed as required. The processor may process instructions executed within the computer, including instructions stored in the memory or on the memory to display graphical information of the GUI (Graphical User Interface) on an external input/output device such as a display device coupled to the interface. In other embodiments, a plurality of processors and/or buses can be used with a plurality of memories and processors, if desired. Similarly, a plurality of computers can be connected, each providing some of the necessary operations. A processor 201 is taken as an example in FIG. 2.

The memory 202 is a non-transitory computer-readable storage medium according to the disclosure. The memory stores instructions executable by at least one processor, so that the at least one processor executes the above method. The non-transitory computer-readable storage medium of the disclosure stores computer instructions that are configured to cause a computer to execute the method (the method as illustrated in FIG. 1).

As the non-transitory computer-readable storage medium, the memory 202 is configured to store non-transitory software programs, non-transitory computer executable programs and modules, such as program instructions/modules corresponding to the above method. The processor 201 executes various functional applications and data processing of the computer by running non-transitory software programs, instructions, and modules stored in the memory 202, that is, implementing the above method in the foregoing embodiment of FIG. 1.

The memory 202 may include a storage program area and a storage data area, where the storage program area may store an operating system and application programs required for at least one function. The storage data area may store data created according to the use of the computer, and the like. In addition, the memory 202 may include a high-speed random-access memory, and a non-transitory memory, such as at least one magnetic disk storage device, a flash memory device, or other non-transitory solid-state storage device. In some embodiments, the memory 202 may optionally include a memory remotely disposed with respect to the processor 201, and these remote memories may be connected to the computer through a network. Examples of the above network include, but are not limited to, the Internet, an intranet, a local area network, a mobile communication network, and combinations thereof.

The computer may further include an input device 203 and an output device 204. The processor 201, the memory 202, the input device 203, and the output device 204 may be connected through a bus or in other manners. In FIG. 2, the connection through the bus is taken as an example.

The input device 203 may receive inputted numeric or character information, and generate key signal inputs related to user settings and function control of the computer, such as a touch screen, a keypad, a mouse, a trackpad, a touchpad, an indication rod, one or more mouse buttons, trackballs, joysticks and other input devices. The output device 204 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general-purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

It should be understood that the various forms of processes shown above can be used to reorder, add, or delete steps. For example, the steps described in this disclosure can be executed in parallel, sequentially, or in different orders, as long as the desired results of the technical solutions disclosed in this disclosure can be achieved, which is no limited herein.

The foregoing specific implementations do not constitute a limitation on the protection scope of the present disclosure. It should be understood by those skilled in the art that various modifications, combinations, sub-combinations, and substitutions may be made according to design requirements and other factors. Any modification, equivalent replacement and improvement made within the spirit and principle of this disclosure shall be included in the protection scope of this disclosure.

What is claimed is:

1. A method for controlling a heating system, comprising:
   establishing a load flow model of the heating system, wherein the heating system comprises pipelines and nodes; the nodes comprise loads and heating sources; the load flow model comprises an objective function and constraints; the objective function for maximizing and minimizing an inlet water temperature of each load or each source;
   solving the load flow model to obtain an upper limit and a lower limit of the inlet water temperature of each load or each source; and controlling the inlet water temperature of each load or each source based on the upper limit and the lower limit of the inlet water temperature of each load or each source, wherein the objective function is denoted by formulas of:

$$\max T_i^{out}, i \in \Psi^l \cup \Psi^s, \text{ and}$$

$$\min T_i^{out}, i \in \Psi^l \cup \Psi^s,$$

where,
- i represents a serial number of the nodes,
- $\Psi^l$ represents a serial number of nodes connecting to each load,
- $\Psi^s$ represents a serial number of nodes connecting to each source, and
- $T_i^{out}$ represents the inlet water temperature of the load or the source connecting to node i;

wherein the constraints comprise coupling constraints for the heating system, and the coupling constraints are denoted by formulas of:

$$\text{s.t. } T_{end,j} = (T_{start,j} - T_a)e^{-\frac{\lambda_j L_j}{C_p \dot{m}_j}} + T_a, j = 1, 2, \ldots, M, \text{ and}$$

$$\left(\sum_{j \in \Psi_i^+} \dot{m}_j\right) T_i + \dot{m}_i^{out} T_i^{out} = \sum_{j \in \Psi_i^-} (\dot{m}_j T_{end,j}) + \dot{m}_i^{in} T_i^{in}, i = 1, 2, \ldots, N,$$

where,
- j represents a serial number of the pipelines,
- M represents a total number of the pipelines,
- N represents a total number of the nodes,
- $T_{end,j}$ represents a water temperature of an end terminal of pipeline j,
- $T_{start,j}$ represents a water temperature of a start terminal of pipeline j,
- $T_a$ represents an ambient temperature;
- $\lambda_j$ represents a heat dissipation coefficient of pipeline j,
- $L_j$ represents a length of pipeline j,
- $C_p$ represents a specific heat at constant pressure of water in the pipeline,
- $\dot{m}_j$ represents a mass flow rate of water flowing through pipeline j,
- $T_i$ represents a water temperature of node i,
- $\dot{m}_i^{in}$ represents a mass flow rate of water flowing into node i from one or more loads or sources,
- $T_i^{in}$ represents an outlet water temperature of the load or the source connecting to node i,
- $\dot{m}_i^{out}$ represents a mass flow rate of water flowing from node i into one or more loads or sources,
- $T_i^{out}$ represents the inlet water temperature of the load or the source connecting to node i,
- $\Psi_i^+$ represents a set of pipelines of which the start terminal is node i, and
- $\Psi_i^-$ represents a set of pipelines of which the end terminal is node i.

2. The method of claim 1, wherein the constraints further comprise an upper and lower bound constraint of heat dissipation coefficient, and the upper and lower bound constraint is denoted by a formula of:

$$\lambda_{j,l} \leq \lambda_j \leq \lambda_{j,u},$$

where,
- $\lambda_j$ represents a heat dissipation coefficient of each of the pipelines,
- $\lambda_{j,l}$ represents a lower limit of $\lambda_j$, and
- $\lambda_{j,u}$ represents an upper limit of $\lambda_j$.

3. The method of claim 2, wherein $\lambda_{j,l}$ and $\lambda_{j,u}$ are obtained by formulas of:

$$\lambda_{j,l} = \lambda_j \times \sigma_l, \text{ and}$$

$$\lambda_{j,u} = \lambda_j \times \sigma_u,$$

where, $\sigma_l$ and $\sigma_u$ represent fluctuation ratios of the heat dissipation coefficient.

4. The method of claim 3, wherein $\sigma_l$ and $\sigma_u$ are preset values, satisfying:

$$0 < \sigma_l < 1,$$

$$\sigma_u > 1.$$

5. An apparatus for planning a power distribution network, comprising:
- a processor; and
- a memory for storing instructions executable by the processor;

wherein the processor is configured to carry out:
- establishing a load flow model of the heating system, wherein the heating system comprises pipelines and nodes; the nodes comprise loads and heating sources; the load flow model comprises an objective function and constraints; the objective function for maximizing and minimizing an inlet water temperature of each load or each source;
- solving the load flow model to obtain an upper limit and a lower limit of the inlet water temperature of each load or each source; and
- controlling the inlet water temperature of each load or each source based on the upper limit and the lower limit of the inlet water temperature of each load or each source, wherein the objective function is denoted by formulas of:

$$\max T_i^{out}, i \in \Psi^l \cup \Psi^s, \text{ and}$$

$$\min T_i^{out}, i \in \Psi^l \cup \Psi^s,$$

where,
- i represents a serial number of the nodes,
- $\Psi^l$ represents a serial number of nodes connecting to each load,
- $\Psi^s$ represents a serial number of nodes connecting to each source, and
- $T_i^{out}$ represents the inlet water temperature of the load or the source connecting to node i;

wherein the constraints comprise coupling constraints for the heating system, and the coupling constraints are denoted by formulas of:

$$\text{s.t. } T_{end,j} = (T_{start,j} - T_a)e^{-\frac{\lambda_j L_j}{C_p \dot{m}_j}} + T_a, j = 1, 2, \ldots, M, \text{ and}$$

$$\left(\sum_{j \in \Psi_i^+} \dot{m}_j\right) T_i + \dot{m}_i^{out} T_i^{out} = \sum_{j \in \Psi_i^-} (\dot{m}_j T_{end,j}) + \dot{m}_i^{in} T_i^{in}, i = 1, 2, \ldots, N,$$

where,
- j represents a serial number of the pipelines,
- M represents a total number of the pipelines,
- N represents a total number of the nodes,
- $T_{end,j}$ represents a water temperature of an end terminal of pipeline j,
- $T_{start,j}$ represents a water temperature of a start terminal of pipeline j,
- $T_a$ represents an ambient temperature;
- $\lambda_j$ represents a heat dissipation coefficient of pipeline j, $L_j$ represents a length of pipeline j, $C_p$ represents a specific heat at constant pressure of water in the pipeline, $\dot{m}_j$ represents a mass flow rate of water flowing through pipeline, $T_i$ represents a water temperature of node i, $\dot{m}_i^{in}$ represents a mass flow rate of water flowing into node i from one or more loads or sources, $T_i^{in}$ represents an outlet water temperature of the load or the source connecting to node i, $\dot{m}_i^{out}$ represents a mass flow rate of water flowing from node i into one or more loads or sources, $T_i^{out}$ represents the inlet water temperature of the load or the source connecting to node i, $\Psi_i^+$ represents a set of pipelines of which the start terminal is node i, and $\Psi_i^-$ represents a set of pipelines of which the end terminal is node i.

6. The apparatus of claim 5, wherein the constraints further comprise an upper and lower bound constraint of heat dissipation coefficient, and the upper and lower bound constraint is denoted by a formula of:

$$\lambda_{j,l} \leq \lambda_j \leq \lambda_{j,u},$$

where, $\lambda_j$ represents a heat dissipation coefficient of each of the pipelines, $\lambda_{j,l}$ represents a lower limit of $\lambda_j$, and $\lambda_{j,u}$ represents an upper limit of $\lambda_j$.

7. The apparatus of claim 6, wherein $\lambda_{j,l}$ and $\lambda_{j,u}$ are obtained by formulas of:

$$\lambda_{j,l} = \lambda_j \times \sigma_l, \text{ and}$$

$$\lambda_{j,u} = \lambda_j \times \sigma_u,$$

where, $\sigma_l$ and $\sigma_u$ represent fluctuation ratios of the heat dissipation coefficient.

8. The apparatus of claim 7, wherein $\sigma_l$ and $\sigma_u$ are preset values, satisfying:

$$0 < \sigma_l < 1,$$

$$\sigma_u > 1.$$

9. A non-transitory computer-readable storage medium having stored therein instructions that, when executed by a processor of a terminal, causes the terminal to perform a method for planning a power distribution network, the method comprising:

establishing a load flow model of the heating system, wherein the heating system comprises pipelines and nodes; the nodes comprise loads and heating sources; the load flow model comprises an objective function and constraints; the objective function for maximizing and minimizing an inlet water temperature of each load or each source;

solving the load flow model to obtain an upper limit and a lower limit of the inlet water temperature of each load or each source; and controlling the inlet water temperature of each load or each source based on the upper limit and the lower limit of the inlet water temperature of each load or each source, wherein the objective function is denoted by formulas of:

$$\max T_i^{out}, i \in \Psi^l \cup \Psi^s, \text{ and}$$

$$\min T_i^{out}, i \in \Psi^l \cup \Psi^s,$$

where, i represents a serial number of the nodes, $\Psi^l$ represents a serial number of nodes connecting to each load, $\Psi^s$ represents a serial number of nodes connecting to each source, and $T_i^{out}$ represents the inlet water temperature of the load or the source connecting to node i, wherein the constraints comprise coupling constraints for the heating system, and the coupling constraints are denoted by formulas of:

$$\text{s.t. } T_{end,j} = (T_{start,j} - T_a)e^{-\frac{\lambda_j L_j}{C_p \dot{m}_j}} + T_a, j = 1, 2, \ldots, M, \text{ and}$$

$$\left(\sum_{j \in \Psi_i^+} \dot{m}_j\right) T_i + \dot{m}_i^{out} T_i^{out} = \sum_{j \in \Psi_i^-} (\dot{m}_j T_{end,j}) + \dot{m}_i^{in} T_i^{in}, i = 1, 2, \ldots, N,$$

where, j represents a serial number of the pipelines,

M represents a total number of the pipelines,

N represents a total number of the nodes, $T_{end,j}$ represents a water temperature of an end terminal of pipeline j, $T_{start,j}$ represents a water temperature of a start terminal of pipeline j, $T_a$ represents an ambient temperature;

$\lambda_j$ represents a heat dissipation coefficient of pipeline j, $L_j$ represents a length of pipeline j, $C_p$ represents a specific heat at constant pressure of water in the pipeline, $\dot{m}_j$ represents a mass flow rate of water flowing through pipeline, $T_i$ represents a water temperature of node i, $\dot{m}_i^{in}$ represents a mass flow rate of water flowing into node i from one or more loads or sources, $T_i^{in}$ represents an outlet water temperature of the load or the source connecting to node i, $\dot{m}_i^{out}$ represents a mass flow rate of water flowing from node i into one or more loads or sources, $T_i^{out}$ represents the inlet water temperature of the load or the source connecting to node i, $\Psi_i^+$ represents a set of pipelines of which the start terminal is node i, and $\Psi_i^-$ represents a set of pipelines of which the end terminal is node i.

10. The non-transitory computer-readable storage medium of claim 9, wherein the constraints further comprise an upper and lower bound constraint of heat dissipation coefficient, and the upper and lower bound constraint is denoted by a formula of:

$$\lambda_{j,l} \leq \lambda_j \leq \lambda_{j,u},$$

where, $\lambda_j$ represents a heat dissipation coefficient of each of the pipelines, $\lambda_{j,l}$ represents a lower limit of $\lambda_j$, and $\lambda_{j,u}$ represents an upper limit of $\lambda_j$.

11. The non-transitory computer-readable storage medium of claim 10, wherein $\lambda_{j,l}$ and $\lambda_{j,u}$ are obtained by formulas of:

$$\lambda_{j,l} = \lambda_j \times \sigma_l, \text{ and}$$

$$\lambda_{j,u} = \lambda_j \times \sigma_u,$$

where, $\sigma_l$ and $\sigma_u$ represent fluctuation ratios of the heat dissipation coefficient.

12. The non-transitory computer-readable storage medium of claim 11, wherein $\sigma_l$ and $\sigma_u$ are preset values, satisfying:

$0<\sigma_l<1$, $\sigma_u>1$.

* * * * *